July 5, 1932. H. P. MOSS 1,866,265
COMBINED RADIATOR GUARD, BUMPER SUPPORT, AND TOW HOOK FOR TRUCKS
Filed Nov. 22, 1930
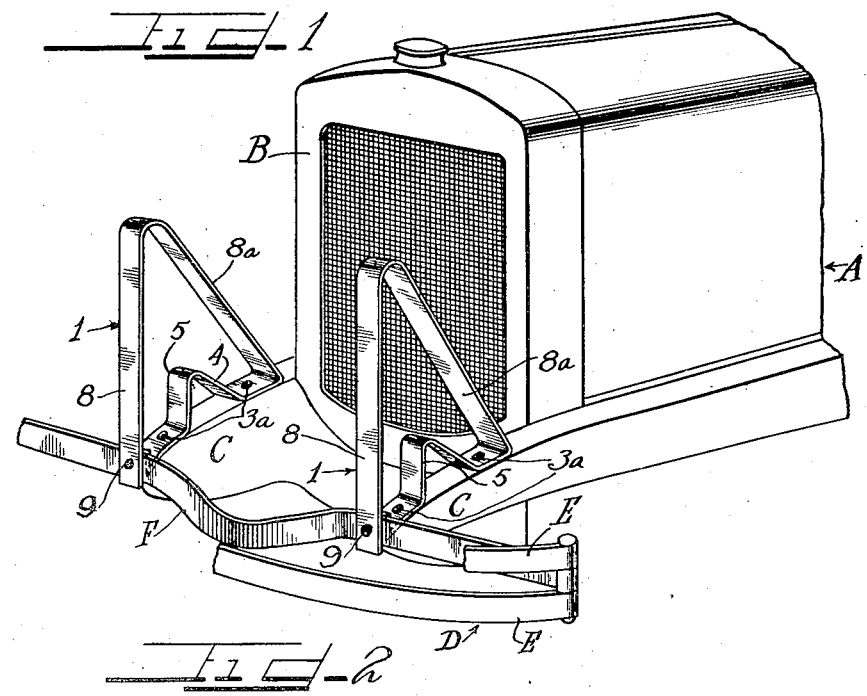
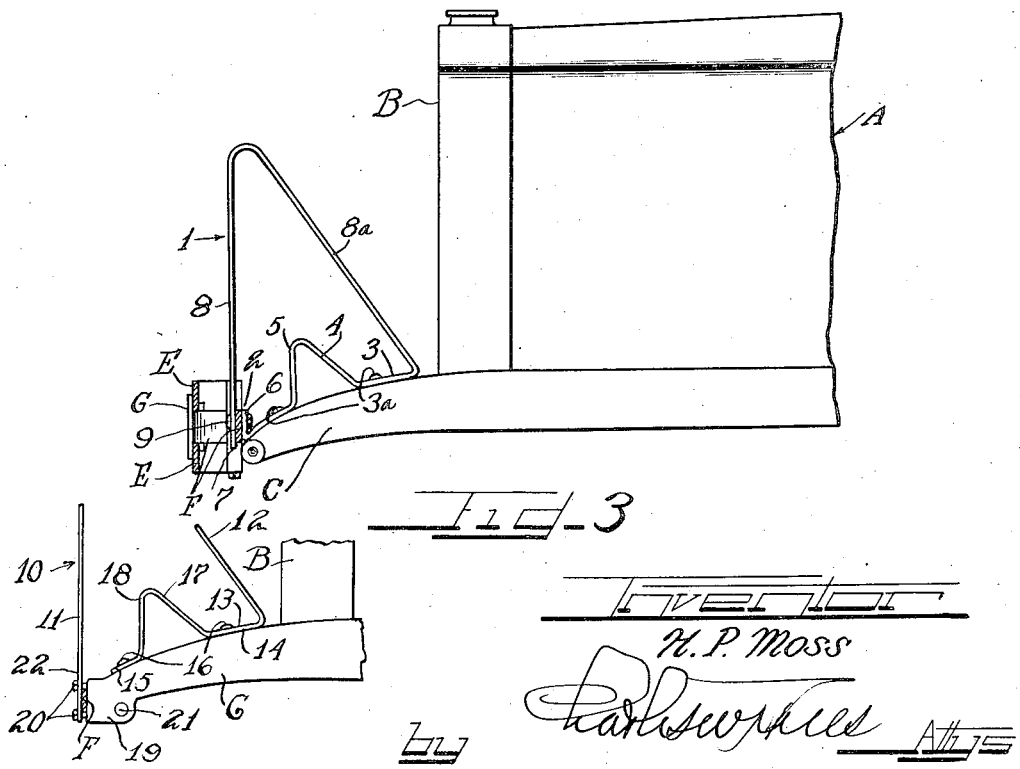
Inventor
H. P. Moss Patented July 5, 1932

1,866,265

UNITED STATES PATENT OFFICE

H. P. MOSS, OF DETROIT, MICHIGAN

COMBINED RADIATOR GUARD, BUMPER SUPPORT AND TOW HOOK FOR TRUCKS

Application filed November 22, 1930. Serial No. 497,384.

This invention relates to motor vehicles and has particular reference to that character of device which is employed in connection with one end of a vehicle to support the bumper, guard the radiator or other part of the vehicle and provide means for the attachment of a tow line for pulling the car when the latter has been incapacitated.

One of the objects of the invention is to provide a pair of substantially indentical resilient members which are adapted to be connected to the extremities of the chassis or frame at one end of a vehicle and also to the back bar of a bumper and having means providing for the attachment of a tow line, and serving also to prevent injury to the radiator or other part of the car.

A further object of the invention is to provide a structure of this character involving primarily two parts each substantially identical with the other, to act in an auxiliary capacity to the bumper.

Other and further important objects and advantages of this invention will be apparent from the disclosures in the specification and the accompanying drawing.

This invention (in a preferred form) is illustrated in the drawing and hereinafter more fully described.
On the drawing:

Figure 1 is a fragmentary perspective view showing the invention as applied in conjunction with the radiator of an automobile.

Figure 2 is a fragmentary sectional side elevation of the construction appearing in Figure 1.

Figure 3 is a fragmentary elevation showing a modified form of connection with a bumper, the latter appearing in section.
Referring now more particularly to the drawing, wherein the same parts are indicated in each case by the same reference characters, the motor vehicle indicated generally at A may be a truck and is provided with the usual radiator B, chassis members or frame horns C and bumper D, the latter in this instance being illustrated as being of the character embodying spaced bars E and an intermediate back bar F and having an intermediate clamp G, although any other type of bumper may be used.

The salient embodiment of the invention comprises a pair of brackets 1 of substantially identical construction, each in the general form of the musical instrument known as a triangle, that is, with one apex open as indicated at 2. The base 3 of each triangular member is preferably secured by suitable means 3a to the chassis members C and is provided intermediate its ends with a hump 4 extending upwardly therefrom and providing an anchorage portion 5. Each loop 5 may receive an end of a tow line, or, if desired, the tow line may be passed through both loops 5. The forward end of each base portion 3 is free and is preferably provided with an upstanding lip 6 substantially parallel with the back bar F of the bumper, and disposed adjacent thereto. The free lower end 7 of the forward arm 8 of each triangular bracket 1 is substantially parallel to the lip 6, and disposed between these two portions is the back bar F, the latter being connected to the portions 6 and 7 by rivets or the like 9. The triangular members 1 being made of spring metal such as steel, it will be appreciated that the sides 8 and 8a will serve to absorb shocks incident to collision very much in the manner of the bumper itself.

It will be noted that the members 1 may be made of strap metal involving an extremely low cost of manufacture and such members are substantially complete in themselves, there being no moving parts to rattle. Moreover, the members 1 may be attached in a few moments, whereas devices of this general character heretofore in use or suggested have been so complex and cumbersome as to require numerous operations in the assembly of the same to the automobile. In addition, the members embody anchorages which are conveniently located and are immediately accessible for tow purposes.

Figure 3 shows a construction which may be more practical than that heretofore described, insofar as the securing of the back bar of the bumper is concerned. In this form, each substantially triangular bracket 10 comprises the impact arm 11 and the rear arm 12 and the base 13. The base is humped at 17 to provide an anchorage 18, which separates the free end 15 from the opposite end 14 of the base, the latter being secured to the frame horn G by riveting 16 or the like. The frame horn G is preferably provided with a front extension 19 beyond the shackle eye 21 to constitute a securing support to receive the bolts 20. These bolts pass through the free depending portion 22 of the arm 11 and straddle the upper and lower edges of the back bar F.

With the construction just described, the impacts of the front bars of the bumper are transmitted directly to the chassis, which is as it should be, thereby relieving the base 13 of consequent strain and reserving the latter and the securing means 16 to withstand stresses incident to impact of the arms 11 of the brackets 10 guarding the radiator B.

The advantages of the invention apply to the second form of the invention just as well as to the first.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. As an article of manufacture, a bracket comprising an open substantially triangular spring metal strap having a base provided with means for attachment thereof to a support, the attaching portions being separated by an intermediate humped portion providing an anchorage for receiving a tow line, the free ends of the triangular member extending in spaced parallelism with each other and having means for attaching a bumper bar therebetween, the remaining portions of the triangular member constituting resilient impact means.

2. In a device of the class described, a vehicle including a radiator and frame horns, impact receiving brackets secured to said frame horns in radiator guarding position, said brackets including portions extending in spaced relation to the forward ends of the horns, a bumper including a bar located between said portions and said horns, and means straddling said bar and securing said portions and bar to said horns.

3. In a device of the class described, a vehicle having frame horns, impact receiving guard means secured to said horns, said means having loop portions to receive a tow line, a bumper, and instrumentalities securing said bumper to said means, whereby said means constitutes a support for said bumper, said means comprising a strap, said loop portions being connected to said horns in spaced relation to the bumper and being otherwise unconnected to the bumper, whereby said loop portions are relieved of stresses incident to impact of said bumper.

4. In a device of the character described, a chassis frame horn, a triangular bracket having a base engaging the upper surface of said horn, a humped portion in said base whereby an anchorage is provided for towing purposes, and means for securing said bracket to said horn.

In testimony whereof I have hereunto subscribed my name at Detroit, Wayne County, Michigan.

H. P. MOSS.